US012732501B2

(12) United States Patent
Repal et al.

(10) Patent No.: US 12,732,501 B2
(45) Date of Patent: Sep. 8, 2026

(54) IDENTITY PROVIDER MESH NETWORKS AND RELATED APPARATUSES, SYSTEMS, AND METHODS

(71) Applicant: CDK GLOBAL, LLC, Hoffman Estates, IL (US)

(72) Inventors: Aashish Vijay Repal, Pune (IN); Winston Moses Dhanraj, Pune (IN)

(73) Assignee: CDK Global, LLC, Austin, TX (US)

( * ) Notice: Subject to any disclaimer, the term of this patent is extended or adjusted under 35 U.S.C. 154(b) by 452 days.

(21) Appl. No.: 18/457,909

(22) Filed: Aug. 29, 2023

(65) Prior Publication Data

US 2025/0080535 A1 Mar. 6, 2025

(51) Int. Cl.
*G06F 15/16* (2006.01)
*H04L 9/40* (2022.01)
*H04L 67/12* (2022.01)

(52) U.S. Cl.
CPC .......... *H04L 63/10* (2013.01); *H04L 63/0807* (2013.01); *H04L 67/12* (2013.01)

(58) Field of Classification Search
CPC ...... H04L 63/10; H04L 63/0807; H04L 67/12
See application file for complete search history.

(56) References Cited

U.S. PATENT DOCUMENTS 3,792,445 A 2/1974 Bucks et al.
4,258,421 A 3/1981 Juhasz et al.
4,992,940 A 2/1991 Dworkin
5,003,476 A 3/1991 Abe
5,034,889 A 7/1991 Abe
5,058,044 A 10/1991 Stewart et al.
5,421,015 A 5/1995 Khoyi et al.
5,442,553 A 8/1995 Parrillo
5,452,446 A 9/1995 Johnson
5,521,815 A 5/1996 Rose, Jr.
5,649,186 A 7/1997 Ferguson
5,694,595 A 12/1997 Jacobs et al.
(Continued)

FOREIGN PATENT DOCUMENTS

CA 2494350 5/2004
EP 0461888 3/1995
WO 2007002759 1/2007

OTHER PUBLICATIONS http://web.archive.org/web/20010718130244/http://chromedata.com/maing2/about/index.asp, 1 pg.
(Continued)

*Primary Examiner* — Normin Abedin
(74) *Attorney, Agent, or Firm* — Stoel Rives LLP

(57) ABSTRACT

Identity provider (IDP) mesh networks and related systems, apparatuses, and methods are disclosed. A first software domain to participate in an IDP mesh network manages first software applications of the first software domain. A first IDP of the first software domain provides access to the first software applications of the first software domain to first users registered with the first software domain responsive to first verified login credentials provided to the first IDP. The first IDP also federates, with a second IDP of a second software domain participating in the IDP mesh network, access of the first users to second software applications of the second software domain responsive to the first verified login credentials.

20 Claims, 6 Drawing Sheets

(56) References Cited

U.S. PATENT DOCUMENTS 5,729,452 A 3/1998 Smith et al.
5,764,943 A 6/1998 Wechsler
5,787,177 A 7/1998 Leppek
5,790,785 A 8/1998 Klug et al.
5,835,712 A 11/1998 Dufresne
5,845,299 A 12/1998 Arora et al.
5,862,346 A 1/1999 Kley et al.
5,911,145 A 6/1999 Arora et al.
5,956,720 A 9/1999 Fernandez et al.
5,974,149 A 10/1999 Leppek
5,974,418 A 10/1999 Blinn et al.
5,974,428 A 10/1999 Gerard et al.
5,978,776 A 11/1999 Seretti et al.
5,987,506 A 11/1999 Carter et al.
6,003,635 A 12/1999 Bantz et al.
6,006,201 A 12/1999 Berent et al.
6,009,410 A 12/1999 Lemole et al.
6,018,748 A 1/2000 Smith
6,021,416 A 2/2000 Dauerer et al.
6,021,426 A 2/2000 Douglis et al.
6,026,433 A 2/2000 D'Arlach et al.
6,041,310 A 3/2000 Green et al.
6,041,344 A 3/2000 Bodamer et al.
6,055,541 A 4/2000 Solecki et al.
6,061,698 A 5/2000 Chadha et al.
6,067,559 A 5/2000 Allard et al.
6,070,164 A 5/2000 Vagnozzi
6,134,532 A 10/2000 Lazarus et al.
6,151,609 A 11/2000 Truong
6,178,432 B1 1/2001 Cook et al.
6,181,994 B1 1/2001 Colson et al.
6,185,614 B1 2/2001 Cuomo et al.
6,189,104 B1 2/2001 Leppek
6,216,129 B1 4/2001 Eldering
6,219,667 B1 4/2001 Lu et al.
6,236,994 B1 5/2001 Schwartz et al.
6,240,365 B1 5/2001 Bunn
6,263,268 B1 7/2001 Nathanson
6,285,932 B1 9/2001 De et al.
6,289,382 B1 9/2001 Bowman-Amuah
6,295,061 B1 9/2001 Park et al.
6,330,499 B1 12/2001 Chou et al.
6,343,302 B1 1/2002 Graham
6,353,824 B1 3/2002 Boguraev et al.
6,356,822 B1 3/2002 Diaz et al.
6,374,241 B1 4/2002 Lamburt et al.
6,397,226 B1 5/2002 Sage
6,397,336 B2 5/2002 Leppek
6,401,103 B1 6/2002 Ho et al.
6,421,733 B1 7/2002 Tso et al.
6,473,849 B1 10/2002 Keller et al.
6,496,855 B1 12/2002 Hunt et al.
6,505,106 B1 1/2003 Lawrence et al.
6,505,205 B1 1/2003 Kothuri et al.
6,519,617 B1 2/2003 Wanderski et al.
6,529,948 B1 3/2003 Bowman-Amuah
6,535,879 B1 3/2003 Behera
6,539,370 B1 3/2003 Chang et al.
6,546,216 B2 4/2003 Mizoguchi et al.
6,553,373 B2 4/2003 Boguraev et al.
6,556,904 B1 4/2003 Larson et al.
6,564,216 B2 5/2003 Waters
6,571,253 B1 5/2003 Thompson et al.
6,581,061 B2 6/2003 Graham
6,583,794 B1 6/2003 Wattenberg
6,594,664 B1 7/2003 Estrada et al.
6,606,525 B1 8/2003 Muthuswamy et al.
6,629,148 B1 9/2003 Ahmed et al.
6,640,244 B1 10/2003 Bowman-Amuah et al.
6,643,663 B1 11/2003 Dabney et al.
6,654,726 B1 11/2003 Hanzek
6,674,805 B1 1/2004 Kovacevic et al.
6,678,706 B1 1/2004 Fishel
6,697,825 B1 2/2004 Underwood et al.
6,701,232 B2 3/2004 Yamaki
6,721,747 B2 4/2004 Lipkin
6,728,685 B1 4/2004 Ahluwalia
6,738,750 B2 5/2004 Stone et al.
6,744,735 B1 6/2004 Nakaguro
6,748,305 B1 6/2004 Klausner et al.
6,785,864 B1 8/2004 Te et al.
6,795,819 B2 9/2004 Wheeler et al.
6,823,258 B2 11/2004 Ukai et al.
6,823,359 B1 11/2004 Heidingsfeld
6,826,594 B1 11/2004 Pettersen
6,847,988 B2 1/2005 Toyouchi et al.
6,850,823 B2 2/2005 Eun et al.
6,871,216 B2 3/2005 Miller et al.
6,894,601 B1 5/2005 Grunden et al.
6,901,430 B1 5/2005 Smith
6,917,941 B2 7/2005 Wight et al.
6,922,674 B1 7/2005 Nelson
6,941,203 B2 9/2005 Chen
6,944,677 B1 9/2005 Zhao
6,954,731 B1 10/2005 Montague et al.
6,963,854 B1 11/2005 Boyd et al.
6,965,806 B2 11/2005 Eryurek et al.
6,965,968 B1 11/2005 Touboul
6,978,273 B1 12/2005 Bonneau et al.
6,981,028 B1 12/2005 Rawat et al.
6,990,629 B1 1/2006 Heaney et al.
6,993,421 B2 1/2006 Pillar
7,000,184 B2 2/2006 Matveyenko et al.
7,003,476 B1 2/2006 Samra et al.
7,010,495 B1 3/2006 Samra et al.
7,028,072 B1 4/2006 Kliger et al.
7,031,554 B2 4/2006 Iwane
7,039,704 B2 5/2006 Davis et al.
7,047,318 B1 5/2006 Svedloff
7,062,343 B2 6/2006 Ogushi et al.
7,062,506 B2 6/2006 Taylor et al.
7,072,943 B2 7/2006 Landesmann
7,092,803 B2 8/2006 Kapolka et al.
7,107,268 B1 9/2006 Zawadzki et al.
7,124,116 B2 10/2006 Huyler
7,152,207 B1 12/2006 Underwood et al.
7,155,491 B1 12/2006 Schultz et al.
7,171,418 B2 1/2007 Blessin
7,184,866 B2 2/2007 Squires et al.
7,197,764 B2 3/2007 Cichowlas
7,219,234 B1 5/2007 Ashland et al.
7,240,125 B2 7/2007 Fleming
7,246,263 B2 7/2007 Skingle
7,281,029 B2 10/2007 Rawat
7,287,000 B2 10/2007 Boyd et al.
7,322,007 B2 1/2008 Schowtka et al.
7,386,786 B2 6/2008 Davis et al.
7,401,289 B2 7/2008 Lachhwani et al.
7,406,429 B2 7/2008 Salonen
7,433,891 B2 10/2008 Haber et al.
7,457,693 B2 11/2008 Olsen et al.
7,477,968 B1 1/2009 Lowrey
7,480,551 B1 1/2009 Lowrey et al.
7,496,543 B1 2/2009 Bamford et al.
7,502,672 B1 3/2009 Kolls
7,536,641 B2 5/2009 Rosenstein et al.
7,548,985 B2 6/2009 Guigui
7,587,504 B2 9/2009 Adams et al.
7,590,476 B2 9/2009 Shumate
7,593,925 B2 9/2009 Cadiz et al.
7,593,999 B2 9/2009 Nathanson
7,613,627 B2 11/2009 Doyle et al.
7,620,484 B1 11/2009 Chen
7,624,342 B2 11/2009 Matveyenko et al.
7,657,594 B2 2/2010 Banga et al.
7,664,667 B1 2/2010 Ruppelt et al.
7,739,007 B2 6/2010 Logsdon
7,747,680 B2 6/2010 Ravikumar et al.
7,778,841 B1 8/2010 Bayer et al.
7,801,945 B1 9/2010 Geddes et al.
7,818,380 B2 10/2010 Tamura et al.
7,861,309 B2 12/2010 Spearman et al.
7,865,409 B1 1/2011 Monaghan
7,870,253 B2 1/2011 Muilenburg et al.

(56) References Cited

U.S. PATENT DOCUMENTS 7,899,701 B1 3/2011 Odom
7,908,051 B2 3/2011 Oesterling
7,979,506 B2 7/2011 Cole
8,010,423 B2 8/2011 Bodin et al.
8,019,501 B2 9/2011 Breed
8,036,788 B2 10/2011 Breed
8,051,159 B2 11/2011 Muilenburg et al.
8,055,544 B2 11/2011 Ullman et al.
8,060,274 B2 11/2011 Boss et al.
8,095,403 B2 1/2012 Price
8,099,308 B2 1/2012 Uyeki
8,135,804 B2 3/2012 Uyeki
8,145,379 B2 3/2012 Schwinke
8,190,322 B2 5/2012 Lin et al.
8,209,259 B2 6/2012 Graham, Jr. et al.
8,212,667 B2 7/2012 Petite et al.
8,271,473 B2 9/2012 Berg
8,271,547 B2 9/2012 Taylor et al.
8,275,717 B2 9/2012 Ullman et al.
8,285,439 B2 10/2012 Hodges
8,296,007 B2 10/2012 Swaminathan et al.
8,311,905 B1 11/2012 Campbell et al.
8,355,950 B2 1/2013 Colson et al.
8,407,664 B2 3/2013 Moosmann et al.
8,428,815 B2 4/2013 Van Engelshoven et al.
8,438,310 B2 5/2013 Muilenburg et al.
8,448,057 B1 5/2013 Sugnet
8,521,654 B2 8/2013 Ford et al.
8,538,894 B2 9/2013 Ullman et al.
8,645,193 B2 2/2014 Swinson et al.
8,676,638 B1 3/2014 Blair et al.
8,725,341 B2 5/2014 Ogasawara
8,745,641 B1 6/2014 Coker
8,849,689 B1 9/2014 Jagannathan et al.
8,886,389 B2 11/2014 Edwards et al.
8,924,071 B2 12/2014 Stanek et al.
8,954,222 B2 2/2015 Costantino
8,996,230 B2 3/2015 Lorenz et al.
8,996,235 B2 3/2015 Singh et al.
9,014,908 B2 4/2015 Chen et al.
9,015,059 B2 4/2015 Sims et al.
9,026,304 B2 5/2015 Olsen, III et al.
9,047,722 B2 6/2015 Kurnik et al.
9,122,716 B1 9/2015 Naganathan et al.
9,165,413 B2 10/2015 Jones et al.
9,183,681 B2 11/2015 Fish
9,325,650 B2 4/2016 Yalavarty et al.
9,349,223 B1 5/2016 Palmer
9,384,597 B2 7/2016 Koch et al.
9,455,969 B1 9/2016 Cabrera et al.
9,477,936 B2 10/2016 Lawson et al.
9,577,866 B2 2/2017 Rogers et al.
9,596,287 B2 3/2017 Rybak et al.
9,619,945 B2 4/2017 Adderly et al.
9,659,495 B2 5/2017 Modica et al.
9,706,008 B2 7/2017 Rajan et al.
9,715,665 B2 7/2017 Schondorf et al.
9,754,304 B2 9/2017 Taira et al.
9,778,045 B2 10/2017 Bang
9,836,714 B2 12/2017 Lander et al.
9,983,982 B1 5/2018 Kumar et al.
10,032,139 B2 7/2018 Adderly et al.
10,083,411 B2 9/2018 Kinsey et al.
10,169,607 B1 1/2019 Sheth et al.
10,229,394 B1 3/2019 Davis et al.
10,448,120 B1 10/2019 Bursztyn et al.
10,475,256 B2 11/2019 Chowdhury et al.
10,509,696 B1 12/2019 Gilderman et al.
10,541,938 B1 1/2020 Timmerman et al.
10,552,871 B1 2/2020 Chadwick
10,630,673 B1 * 4/2020 Lingampally ........... G06F 21/41
10,657,707 B1 5/2020 Leise
10,965,674 B1 * 3/2021 Zigman ................... G06F 21/78
11,080,105 B1 8/2021 Birkett et al.
11,117,253 B2 9/2021 Oleynik
11,190,608 B2 11/2021 Amar et al.
11,392,855 B1 7/2022 Murakonda et al.
2001/0005831 A1 6/2001 Lewin et al.
2001/0014868 A1 8/2001 Herz et al.
2001/0037332 A1 11/2001 Miller et al.
2001/0039594 A1 11/2001 Park et al.
2001/0054049 A1 12/2001 Maeda et al.
2002/0023111 A1 2/2002 Arora et al.
2002/0024537 A1 2/2002 Jones et al.
2002/0026359 A1 2/2002 Long et al.
2002/0032626 A1 3/2002 Dewolf et al.
2002/0032701 A1 3/2002 Gao et al.
2002/0042738 A1 4/2002 Srinivasan et al.
2002/0046245 A1 4/2002 Hillar et al.
2002/0049831 A1 4/2002 Platner et al.
2002/0052778 A1 5/2002 Murphy et al.
2002/0059260 A1 5/2002 Jas
2002/0065698 A1 5/2002 Schick et al.
2002/0065739 A1 5/2002 Florance et al.
2002/0069110 A1 6/2002 Sonnenberg
2002/0073080 A1 6/2002 Lipkin
2002/0082978 A1 6/2002 Ghouri et al.
2002/0091755 A1 7/2002 Narin
2002/0107739 A1 8/2002 Schlee
2002/0111727 A1 8/2002 Vanstory et al.
2002/0111844 A1 8/2002 Vanstory et al.
2002/0116418 A1 8/2002 Lachhwani et al.
2002/0123359 A1 9/2002 Wei et al.
2002/0124053 A1 9/2002 Adams et al.
2002/0128728 A1 9/2002 Murakami et al.
2002/0129054 A1 9/2002 Ferguson et al.
2002/0133273 A1 9/2002 Lowrey et al.
2002/0138331 A1 9/2002 Hosea et al.
2002/0143646 A1 10/2002 Boyden et al.
2002/0154146 A1 10/2002 Rodriquez et al.
2002/0169851 A1 11/2002 Weathersby et al.
2002/0173885 A1 11/2002 Lowrey et al.
2002/0188869 A1 12/2002 Patrick
2002/0196273 A1 12/2002 Krause
2002/0198761 A1 12/2002 Ryan et al.
2002/0198878 A1 12/2002 Baxter et al.
2003/0014443 A1 1/2003 Bernstein et al.
2003/0023632 A1 1/2003 Ries et al.
2003/0033378 A1 2/2003 Needham et al.
2003/0036832 A1 2/2003 Kokes et al.
2003/0036964 A1 2/2003 Boyden et al.
2003/0037263 A1 2/2003 Kamat et al.
2003/0046179 A1 3/2003 Anabtawi et al.
2003/0051022 A1 3/2003 Sogabe et al.
2003/0055666 A1 3/2003 Roddy et al.
2003/0061263 A1 3/2003 Riddle
2003/0065532 A1 4/2003 Takaoka
2003/0065583 A1 4/2003 Takaoka
2003/0069785 A1 4/2003 Lohse
2003/0069790 A1 4/2003 Kane
2003/0074392 A1 4/2003 Campbell et al.
2003/0095038 A1 5/2003 Dix
2003/0101262 A1 5/2003 Godwin
2003/0115292 A1 6/2003 Griffin et al.
2003/0120502 A1 6/2003 Robb et al.
2003/0145310 A1 7/2003 Thames et al.
2003/0177050 A1 9/2003 Crampton et al.
2003/0177175 A1 9/2003 Worley et al.
2003/0225853 A1 12/2003 Wang et al.
2003/0229623 A1 12/2003 Chang et al.
2003/0233246 A1 12/2003 Snapp et al.
2004/0012631 A1 1/2004 Skorski
2004/0039646 A1 2/2004 Hacker
2004/0041818 A1 3/2004 White et al.
2004/0073546 A1 4/2004 Forster et al.
2004/0073564 A1 4/2004 Haber et al.
2004/0088228 A1 5/2004 Mercer et al.
2004/0093243 A1 5/2004 Bodin et al.
2004/0117046 A1 6/2004 Colle et al.
2004/0122735 A1 6/2004 Meshkin et al.
2004/0128320 A1 7/2004 Grove et al.
2004/0139203 A1 7/2004 Graham, Jr. et al.
2004/0148342 A1 7/2004 Cotte
2004/0156020 A1 8/2004 Edwards

(56) References Cited

U.S. PATENT DOCUMENTS

2004/0163047 A1 8/2004 Nagahara et al.
2004/0181464 A1 9/2004 Vanker et al.
2004/0199413 A1 10/2004 Hauser et al.
2004/0220863 A1 11/2004 Porter et al.
2004/0225664 A1 11/2004 Casement
2004/0230897 A1 11/2004 Latzel
2004/0255233 A1 12/2004 Croney et al.
2004/0267263 A1 12/2004 May
2004/0268225 A1 12/2004 Walsh et al.
2004/0268232 A1 12/2004 Tunning
2005/0015491 A1 1/2005 Koeppel
2005/0021197 A1 1/2005 Zimmerman et al.
2005/0027611 A1 2/2005 Wharton
2005/0065804 A1 3/2005 Worsham et al.
2005/0096963 A1 5/2005 Myr et al.
2005/0108112 A1 5/2005 Ellenson et al.
2005/0108637 A1 5/2005 Sahota et al.
2005/0114270 A1 5/2005 Hind et al.
2005/0114764 A1 5/2005 Gudenkauf et al.
2005/0149398 A1 7/2005 McKay
2005/0171836 A1 8/2005 Leacy
2005/0176482 A1 8/2005 Raisinghani et al.
2005/0187834 A1 8/2005 Painter et al.
2005/0198121 A1 9/2005 Daniels et al.
2005/0228736 A1 10/2005 Norman et al.
2005/0256755 A1 11/2005 Chand et al.
2005/0267774 A1 12/2005 Merritt et al.
2005/0268282 A1 12/2005 Laird
2005/0289020 A1 12/2005 Bruns et al.
2005/0289599 A1 12/2005 Matsuura et al.
2006/0031811 A1 2/2006 Ernst et al.
2006/0059253 A1 3/2006 Goodman et al.
2006/0064637 A1 3/2006 Rechterman et al.
2006/0123330 A1 6/2006 Horiuchi et al.
2006/0129423 A1 6/2006 Sheinson et al.
2006/0129817 A1* 6/2006 Borneman .............. H04L 67/53
713/170
2006/0129982 A1 6/2006 Doyle
2006/0136105 A1 6/2006 Larson
2006/0161841 A1 7/2006 Horiuchi et al.
2006/0200751 A1 9/2006 Underwood et al.
2006/0224447 A1 10/2006 Koningstein
2006/0248205 A1 11/2006 Randle et al.
2006/0248442 A1 11/2006 Rosenstein et al.
2006/0265355 A1 11/2006 Taylor
2006/0271844 A1 11/2006 Suklikar
2006/0277588 A1 12/2006 Harrington et al.
2006/0282328 A1 12/2006 Gerace et al.
2006/0282547 A1 12/2006 Hasha et al.
2007/0005446 A1 1/2007 Fusz et al.
2007/0016486 A1 1/2007 Stone et al.
2007/0027754 A1 2/2007 Collins et al.
2007/0033087 A1 2/2007 Combs et al.
2007/0033520 A1 2/2007 Kimzey et al.
2007/0053513 A1 3/2007 Hoffberg
2007/0100519 A1 5/2007 Engel
2007/0150368 A1 6/2007 Arora et al.
2007/0209011 A1 9/2007 Padmanabhuni et al.
2007/0226540 A1 9/2007 Konieczny
2007/0250229 A1 10/2007 Wu
2007/0250327 A1 10/2007 Hedy
2007/0250840 A1 10/2007 Coker et al.
2007/0271154 A1 11/2007 Broudy et al.
2007/0271330 A1 11/2007 Mattox et al.
2007/0271389 A1 11/2007 Joshi et al.
2007/0282711 A1 12/2007 Ullman et al.
2007/0282712 A1 12/2007 Ullman et al.
2007/0282713 A1 12/2007 Ullman et al.
2007/0288413 A1 12/2007 Mizuno et al.
2007/0294192 A1 12/2007 Tellefsen
2008/0010561 A1 1/2008 Bay et al.
2008/0015921 A1 1/2008 Libman
2008/0015929 A1 1/2008 Koeppel et al.
2008/0027827 A1 1/2008 Eglen et al.
2008/0119983 A1 5/2008 Inbarajan et al.
2008/0172632 A1 7/2008 Stambaugh
2008/0189143 A1 8/2008 Wurster
2008/0195435 A1 8/2008 Bentley et al.
2008/0195932 A1 8/2008 Oikawa et al.
2008/0201163 A1 8/2008 Barker et al.
2008/0255925 A1 10/2008 Vailaya et al.
2009/0012887 A1 1/2009 Taub et al.
2009/0024918 A1 1/2009 Silverbrook et al.
2009/0043780 A1 2/2009 Hentrich, Jr. et al.
2009/0070435 A1 3/2009 Abhyanker
2009/0089134 A1 4/2009 Uyeki
2009/0106036 A1 4/2009 Tamura et al.
2009/0112687 A1 4/2009 Blair et al.
2009/0138329 A1 5/2009 Wanker
2009/0182232 A1 7/2009 Zhang et al.
2009/0187513 A1 7/2009 Noy et al.
2009/0187939 A1 7/2009 Lajoie
2009/0198507 A1 8/2009 Rhodus
2009/0204454 A1 8/2009 Lagudi
2009/0204655 A1 8/2009 Wendelberger
2009/0222532 A1 9/2009 Finlaw
2009/0265607 A1 10/2009 Raz et al.
2009/0313035 A1 12/2009 Esser et al.
2010/0011415 A1 1/2010 Cortes et al.
2010/0023393 A1 1/2010 Costy et al.
2010/0070343 A1 3/2010 Taira et al.
2010/0082778 A1 4/2010 Muilenburg et al.
2010/0082780 A1 4/2010 Muilenburg et al.
2010/0088158 A1 4/2010 Pollack
2010/0100259 A1 4/2010 Geiter
2010/0100506 A1 4/2010 Marot
2010/0131363 A1 5/2010 Sievert et al.
2010/0235219 A1 9/2010 Merrick et al.
2010/0235231 A1 9/2010 Jewer
2010/0293030 A1 11/2010 Wu
2010/0312608 A1 12/2010 Shan et al.
2010/0318408 A1 12/2010 Sankaran et al.
2010/0324777 A1 12/2010 Tominaga et al.
2011/0010432 A1 1/2011 Uyeki
2011/0015989 A1 1/2011 Tidwell et al.
2011/0022525 A1 1/2011 Swinson et al.
2011/0082804 A1 4/2011 Swinson et al.
2011/0145064 A1 6/2011 Anderson et al.
2011/0161167 A1 6/2011 Jallapuram
2011/0191264 A1 8/2011 Inghelbrecht et al.
2011/0196762 A1 8/2011 Dupont
2011/0224864 A1 9/2011 Gellatly et al.
2011/0231055 A1 9/2011 Knight et al.
2011/0288937 A1 11/2011 Manoogian, III
2011/0307296 A1 12/2011 Hall et al.
2011/0307411 A1 12/2011 Bolivar et al.
2012/0066010 A1 3/2012 Williams et al.
2012/0089474 A1 4/2012 Xiao et al.
2012/0095804 A1 4/2012 Calabrese et al.
2012/0116868 A1 5/2012 Chin et al.
2012/0158211 A1 6/2012 Chen et al.
2012/0209714 A1 8/2012 Douglas et al.
2012/0221125 A1 8/2012 Bell
2012/0265648 A1 10/2012 Jerome et al.
2012/0268294 A1 10/2012 Michaelis et al.
2012/0278886 A1 11/2012 Luna
2012/0284113 A1 11/2012 Pollak
2012/0316981 A1 12/2012 Hoover et al.
2013/0046432 A1 2/2013 Edwards et al.
2013/0080196 A1 3/2013 Schroeder et al.
2013/0080305 A1 3/2013 Mrag et al.
2013/0151334 A1 6/2013 Berkhin et al.
2013/0191445 A1 7/2013 Gayman et al.
2013/0204484 A1 8/2013 Ricci
2013/0226699 A1 8/2013 Long
2013/0317864 A1 11/2013 Tofte et al.
2013/0325541 A1 12/2013 Capriotti et al.
2013/0332023 A1 12/2013 Bertosa et al.
2014/0012659 A1 1/2014 Yan
2014/0026037 A1 1/2014 Garb et al.
2014/0052327 A1 2/2014 Hosein et al.
2014/0081675 A1 3/2014 Ives et al.
2014/0088866 A1 3/2014 Knapp et al.
2014/0094992 A1 4/2014 Lambert et al.

(56) References Cited

U.S. PATENT DOCUMENTS

| | | | |
|---|---|---|---|
| 2014/0122178 | A1 | 5/2014 | Knight |
| 2014/0136278 | A1 | 5/2014 | Carvalho |
| 2014/0229207 | A1 | 8/2014 | Swamy et al. |
| 2014/0229391 | A1 | 8/2014 | East et al. |
| 2014/0244110 | A1 | 8/2014 | Tharaldson et al. |
| 2014/0277906 | A1 | 9/2014 | Lowrey et al. |
| 2014/0278805 | A1 | 9/2014 | Thompson |
| 2014/0316825 | A1 | 10/2014 | Van Dijk et al. |
| 2014/0324275 | A1 | 10/2014 | Stanek et al. |
| 2014/0324536 | A1 | 10/2014 | Cotton |
| 2014/0331301 | A1 | 11/2014 | Subramani et al. |
| 2014/0337163 | A1 | 11/2014 | Whisnant |
| 2014/0337825 | A1 | 11/2014 | Challa et al. |
| 2014/0379530 | A1 | 12/2014 | Kim et al. |
| 2014/0379817 | A1 | 12/2014 | Logue et al. |
| 2015/0057875 | A1 | 2/2015 | Mcginnis et al. |
| 2015/0058151 | A1 | 2/2015 | Sims et al. |
| 2015/0066781 | A1 | 3/2015 | Johnson et al. |
| 2015/0066933 | A1 | 3/2015 | Kolodziej et al. |
| 2015/0100199 | A1 | 4/2015 | Kurnik et al. |
| 2015/0142256 | A1 | 5/2015 | Jones |
| 2015/0142535 | A1 | 5/2015 | Payne et al. |
| 2015/0227894 | A1 | 8/2015 | Mapes, Jr. et al. |
| 2015/0254591 | A1 | 9/2015 | Raskind |
| 2015/0268059 | A1 | 9/2015 | Borghesani et al. |
| 2015/0268975 | A1 | 9/2015 | Du et al. |
| 2015/0278886 | A1 | 10/2015 | Fusz |
| 2015/0286979 | A1 | 10/2015 | Ming et al. |
| 2015/0290795 | A1 | 10/2015 | Oleynik |
| 2015/0334165 | A1 | 11/2015 | Arling et al. |
| 2016/0004516 | A1 | 1/2016 | Ivanov et al. |
| 2016/0059412 | A1 | 3/2016 | Oleynik |
| 2016/0071054 | A1 | 3/2016 | Kakarala et al. |
| 2016/0092944 | A1 | 3/2016 | Taylor et al. |
| 2016/0132935 | A1 | 5/2016 | Shen et al. |
| 2016/0140609 | A1 | 5/2016 | Demir |
| 2016/0140620 | A1 | 5/2016 | Pinkowish et al. |
| 2016/0140622 | A1 | 5/2016 | Wang et al. |
| 2016/0148439 | A1 | 5/2016 | Akselrod et al. |
| 2016/0162817 | A1 | 6/2016 | Grimaldi et al. |
| 2016/0180358 | A1 | 6/2016 | Battista |
| 2016/0180378 | A1 | 6/2016 | Toshida et al. |
| 2016/0180418 | A1 | 6/2016 | Jaeger |
| 2016/0267503 | A1 | 9/2016 | Zakai-Or et al. |
| 2016/0275533 | A1 | 9/2016 | Smith et al. |
| 2016/0277510 | A1 | 9/2016 | Du et al. |
| 2016/0307174 | A1 | 10/2016 | Marcelle et al. |
| 2016/0335727 | A1 | 11/2016 | Jimenez |
| 2016/0357599 | A1 | 12/2016 | Glatfelter et al. |
| 2016/0371641 | A1 | 12/2016 | Wilson et al. |
| 2017/0034547 | A1 | 2/2017 | Jain et al. |
| 2017/0039785 | A1 | 2/2017 | Richter et al. |
| 2017/0053460 | A1 | 2/2017 | Hauser et al. |
| 2017/0060929 | A1 | 3/2017 | Chesla et al. |
| 2017/0064038 | A1 | 3/2017 | Chen |
| 2017/0093700 | A1 | 3/2017 | Gilley et al. |
| 2017/0124525 | A1 | 5/2017 | Johnson et al. |
| 2017/0126848 | A1 | 5/2017 | George et al. |
| 2021/0336946 | A1* | 10/2021 | Cheng .................... H04L 67/10 |

OTHER PUBLICATIONS http://web.archive.org/web/20050305055408/http://www.dealerclick.com/, 1 pg.

http://web.archive.org/web/20050528073821/http://www.kbb.com/, 1 pg.

http://web.archive.org/web/20050531000823/http://www.carfax.com/, 1 pg.

Internet Archive Dan Gillmor Sep. 1, 1996.

Internet Archive Wayback Machine, archive of LDAP Browser.com—FAQ. Archived Dec. 11, 2000. Available at <http://web.archive.org/web/200012110152/http://www.ldapbrowser.com/faq/faq.php3?sID=fe4ae66f023d86909f35e974f3a1ce>.

Internet Archive Wayback Machine, archive of LDAP Browser.com—Product Info. Archived Dec. 11, 2000. Available at <http://web.archive.org/web/200012110541/http://www.ldapbrowser.com/prodinfo/prodinfo.php3?sID=fe4ae66f2fo23d86909f35e974f3a1ce>.

Internet Archive: Audio Archive, http://www.archive.org/audio/audio-searchresults.php?search=@start=0&limit=100&sort=ad, printed May 12, 2004, 12 pgs.

Internet Archive: Democracy Now, http://www.archive.org/audio/collection.php?collection=democracy_now, printed May 12, 2004, 2 pgs.

Java 2 Platform, Enterprise Edition (J2EE) Overview, printed Mar. 6, 2010, 3 pgs.

Java version history—Wikipedia, the free encyclopedia, printed Mar. 6, 2010, 9 pgs.

Permissions in the Java™ 2 SDK, printed Mar. 6, 2010, 45 pgs.

"An Appointment with Destiny—The Time for Web-Enabled Scheduling has Arrived", Link Fall, 2007, 2 pages.

"How a Solution found a Problem of Scheduling Service Appointments", Automotive News, 2016, 4 pages.

"IBM Tivoli Access Manager Base Administration Guide", Version 5.1. International Business Machines Corporation. Entire book enclosed and cited., 2003, 402 pgs.

"NetFormx Offers Advanced Network Discovery Software", PR Newswire. Retrieved from http://www.highbeam.com/doc/1G1-54102907.html>., Mar. 15, 1999.

"Openbay Announces First-of-its-Kind Connected Car Repair Service", openbay.com, Mar. 31, 2015, 14 pages.

"Service Advisor", Automotive Dealership Institute, 2007, 26 pages.

"XTimes Newsletter", vol. 7, 2013, 4 pages.

Aloisio, Giovanni , et al., "Web-based access to the Grid using the Grid Resource Broker portal", Google, 2002, pp. 1145-1160.

Anonymous , "Software ready for prime time", Automotive News. Detroit, vol. 76, Issue 5996, Nov. 5, 2001, p. 28.

Bedell, Doug , Dallas Morning News, "I Know Someone Who Knows Kevin Bacon". Oct. 27, 1998. 4 pgs.

Chadwick, D.W. , "Understanding X.500—The Directory", Available at <http://sec.cs.kent.ac.uk/x500book/>. Entire work cited., 1996.

Chatterjee, Pallab , et al., "On-board diagnostics not just for racing anymore", EDN.com, May 6, 2013, 7 pages.

Chen, Deren , "Business to Business Standard and Supply Chain System Framework in Virtual Enterprises", Computer Supported Cooperative Work in Design, The Sixth International Conference on 2001, pp. 472-476.

Clemens Grelck , "A Multithread Compiler Backend for High-Level Array Programming", 2003.

CNY Business Journal , "Frank La Voila named Southern Tier Small-Business Person of 1999", Jun. 11, 1999, 2 pages.

Croswell, Wayne , "Service Shop Optimiztion", Modern Tire Retailer, May 21, 2013, 7 pages.

Davis, Peter T., et al., "Sams Teach Yourself Microsoft Windows NT Server 4 in 21 Days", Sams® Publishing, ISBN: 0-672-31555-6, 1999, printed Dec. 21, 2008, 15 pages.

Derfler, Frank J., et al., "How Networks Work: Millennium Edition", Que, A Division of Macmillan Computer Publishing, ISBN: 0-7897-2445-6, 2000, 9 pages.

Drawbaugh, Ben , "Automatic Link Review: an expensive way to learn better driving habits", Endgadget.com, Nov. 26, 2013, 14 pages.

Emmanuel, Daniel , "Basics to Creating an Appointment System for Automotive Service Customers", Automotiveservicemanagement.com, 2006, 9 pages.

Hogue , et al., "Thresher: Automating the Unwrapping of Semantic Content from the World Wide Web", ACM, 2005, pp. 86-95.

Housel, Barron C., et al., "WebExpress: A client/intercept based system for optimizing Web browsing in a wireless environment", Google, 1998, pp. 419-431.

Hu, Bo , "A Platform based Distributed Service Framework for Large-scale Cloud Ecosystem Development", IEEE Computer Society, 2015, 8 pages.

(56) References Cited

OTHER PUBLICATIONS

Interconnection , In Roget's II The New Thesaurus. Boston, MA: Houghton Mifflin http://www.credoreference.com/entry/hmrogets/interconnection, 2003, Retrieved Jul. 16, 2009, 1 page.
Jenkins, Will , "Real-time vehicle performance monitoring with data intergrity", A Thesis Submitted to the Faculty of Mississippi State University, Oct. 2006, 57 pages.
Johns, Pamela, et al., "Competitive intelligence in service marketing", Marketing Intelligence & Planning, vol. 28, No. 5, 2010, pp. 551-570.
Lavrinc, Damon , "First Android-powered infotainment system coming to 2012 Saab 9-3", Autoblog. com, Mar. 2, 2011, 8 pages.
Lee, Adam J., et al., "Searching for Open Windows and Unlocked Doors: Port Scanning in Large-Scale Commodity Clusters", Cluster Computing and the Grid, 2005. IEEE International Symposium on vol. 1, 2005, pp. 146-151.
Michener, J.R. , et al., "Managing System and Active-Content Integrity", Computer; vol. 33, Issue: 7, 2000, pp. 108-110.
Milic-Frayling, Natasa , et al., "SmartView: Enhanced Document Viewer for Mobile Devices", Google, Nov. 15, 2002, 11 pages.
Needham, Charlie , "Google Now Taking Appointments for Auto Repair Shops", Autoshopsolutions.com, Aug. 25, 2015, 6 pages.
Open Bank Project , https://www.openbankproject.com/, retrieved Nov. 23, 2020, 10 pages.
openbay.com Web Pages , Openbay.com, retrieved from archive.org May 14, 2019, Apr. 2015, 6 pages.
openbay.com Web Pages , Openbay.com, retrieved from archive.org on May 14, 2019, Feb. 2014, 2 pages.
openbay.com Web Pages , Openbay.com, retrieved from archive.org, May 14, 2019, Mar. 2015, 11 pages.
Phelan, Mark , "Smart phone app aims to automate car repairs", Detroit Free Press Auto Critic, Mar. 31, 2015, 2 pages.

* cited by examiner

IDENTITY PROVIDER MESH NETWORKS AND RELATED APPARATUSES, SYSTEMS, AND METHODS

TECHNICAL FIELD

This disclosure relates generally to mesh networks of identity providers (IDPs) and related apparatuses, systems, and methods.

BACKGROUND

In various industries it may be useful to provide multiple different software applications to users. The automobile dealership industry is one example of an industry where provisioning of multiple different software applications may be helpful. For example, automobile dealerships may benefit from different software applications for a dealer management system, finance and insurance, customer relations management, automobile insurance, and the like.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
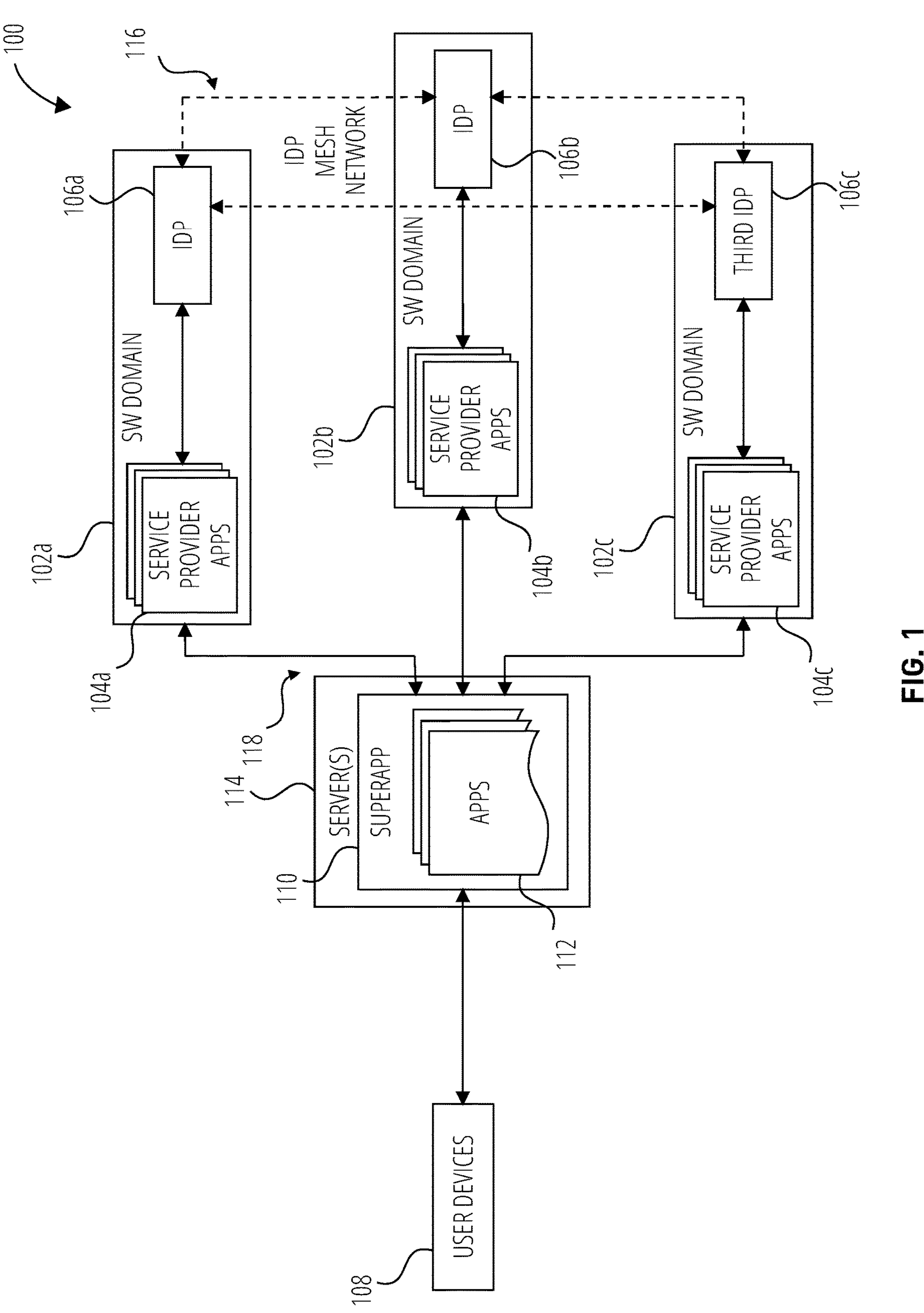
FIG. 1 is a block diagram of an IDP mesh network system, according to some embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used herein, the term "federate" refers to an IDP of one software domain interacting with another IDP of another software domain with which the IDP has a mutual trust to obtain access of the software applications managed by the other IDP of the other software domain for its own users registered with its own software domain.

As used herein, the terms "software application," "software app," "application," and "app" refer to software application that may be executed in whole or in part on a user device (e.g., in an operating system environment of the user device, as a web application via a web browser of the user device, or some combination thereof).

As used herein, the term "superapp" refers to a software application that provides a platform for accessing multiple software applications (e.g., of multiple different software domains), services, and/or features.

In various industries, it may be useful to provide multiple different software applications. One example of an industry where provision of multiple different software applications may be useful is the automobile dealership industry. In the automobile dealership industry, as well as in many other industries, some of these multiple different software applications may be managed by different entities having separate IDPs to verify and provide proof of authentication. Users of these multiple different software systems may interact with the different entities separately to access these multiple different software applications, which may result in the user creating and using multiple different sets of login credentials for these multiple different IDPs.

It may be inconvenient or otherwise undesirable to users to interact with multiple different software applications separately and to keep track of multiple different sets of login credentials to access the multiple different software applications. One way to reduce the number of login credentials a user keeps track of is to use a single IDP to verify login credentials and provide proof of authentication. The single IDP may federate a user's verified identity across multiple service provider software applications. Another way to reduce the number of login credentials a user keeps track of is to use multiple identity and service providers to create a federated identity management system that uses a centralized third-party-based system to establish trust in a system.

Although these approaches may provide a more convenient user experience, it may be costly and/or disruptive to migrate software applications supported by separate IDPs to operate with a single IDP. Accordingly, adding one or more software applications having their own IDP or IDPs to a single IDP system may involve significant reprogramming to enable the one or more software applications to interact with the single IDP of the single IDP system. In some instances the expenses and delays involved with such reprogramming may delay or even prevent addition of certain desired software applications to a multiple software application platform.

Some embodiments may leverage an IDP mesh network to reduce the amount of reprogramming and/or retooling involved in adding software applications already supported by separate IDPs into a multiple software application platform. For example, a managed IDP mesh for enterprises provides seamless user authentication and access management across a diverse suite of software products and systems.

Some embodiments provide a capability to federate multiple disparate IDPs configured in a mesh model so that users may securely access software applications protected by any of the IDPs that are part of the IDP mesh with a single set of sign-on credentials. Some embodiments involve setting up full-duplex, two-way trust across multiple participant IDPs. For example, security assertion markup language 2 (SAML2) protocols may be used to establish this underlying trust network. Additional bi-directional single sign-on (SSO) endpoints and rule-driven user provisioning methods may be used to implement a single logical IDP system comprising multiple IDPs networked in a mesh for the enterprise. The IDP mesh may then support any number of service provider applications including native enterprise products, off-the-shelf third-party commercial products, or acquired custom products. The IDP mesh avoids costly and disruptive user and application migration projects to enable various software applications to be accessed via a single IDP.

FIG. 1 is a block diagram of an IDP mesh network system 100, according to some embodiments. The IDP mesh network system 100 includes one or more servers 114, multiple software domains 102*a*-102*c*, and user devices 108. The software domains 102*a*-102*c* include service provider apps 104*a*-104*c* and IDPs 106*a*-106*c* to manage access of users at the user devices 108 to the service provider apps 104*a*-104*c*. The IDPs 106*a*-106*c* are communicatively coupled with each other in an IDP mesh network 116 to enable single sign-on (SSO) access to the service provider apps 104a-104c to users registered with any one of the software domains 102a-102c.

The software domains 102a-102c may include computing devices, which may include circuitry (e.g., circuitry 600 discussed below with reference to FIG. 6). For example, a first software domain 102a, a second software domain 102b, and a third software domain 102c may each include one or more processors (e.g., the processors 602 of FIG. 6) and one or more non-transitory computer-readable media (e.g., the storage 604 of FIG. 6). The one or more non-transitory computer-readable media include computer-readable instructions (e.g., the machine-executable code 606 of FIG. 6) stored thereon. The computer-readable instructions are configured to instruct the one or more processors to manage one or more software applications. Specifically, the one or more processors of the first software domain 102a manage one or more first software applications (e.g., service provider apps 104a) of the first software domain. The one or more processors of the second software domain 102b manage one or more second software applications (service provider apps 104b). The one or more processors of the third software domain 102c manage one or more third software applications (service provider apps 104c).

The one or more processors of the software domains 102a-102c may also provide access to their own respective software applications to their own respective registered users. For example, the computer-readable instructions are configured to instruct the one or more processors of the first software domain 102a to operate a first IDP 106a to provide access to the one or more first software applications (e.g., service provider apps 104a) of the first software domain 102a to first users registered with the first software domain 102a responsive to first verified login credentials provided to the first IDP 106a. The computer-readable instructions are configured to instruct the one or more processors of the second software domain 102b to operate second IDP 106b to provide access to the one or more second software applications (e.g., service provider apps 104b) of the second software domain 102b to second users registered with the second software domain 102b responsive to second verified login credentials provided to the second IDP 106b. The computer-readable instructions are configured to instruct the one or more processors of the third software domain 102c to operate third IDP 106c to provide access to the one or more third software applications (e.g., service provider apps 104c) of the third software domain 102c to third users registered with the third software domain 102c responsive to third verified login credentials provided to the third IDP 106c.

The one or more processors of the software domains 102a-102c may further operate their respective IDPs 106a-106c to federate, with other IDPs 106a-106c of the other software domains 102a-102c, access of their own respective users to the software applications of the other software domains 102a-102c. For example, the computer-readable instructions are configured to instruct the one or more processors to operate the first IDP 106a to federate, with a second IDP 106b of a second software domain 102b participating in the IDP mesh network, access of the first users to one or more second software applications (e.g., service provider apps 104b) of the second software domain 102b responsive to the first verified login credentials. Also, the computer-readable instructions are configured to instruct the one or more processors to operate the first IDP 106a to federate, with a third IDP 106c of a third software domain 102c participating in the IDP mesh network 116, access of the first users to one or more third software applications (e.g., service provider apps 104c) of the third software domain 102c responsive to the first verified login credentials. Likewise, the second IDP 106b federates, with the first IDP 106a and the third IDP 106c, access of the first software apps of the first software domain 102a and the second software applicant submits of the second software domain 102b, respectively, to the second users registered with the second software domain 102b. Further, the third IDP 106c federates, with the first IDP 106a and the second IDP 106b, access of the first software applicant submits of the first software domain 102a and the second software apps of the third software domain 102c, respectively, to the third users registered with the third software domain 102c.

The one or more processors of the software domains 102a-102c may operate their respective IDPs 106a-106c to provide access to their respective software applications to users registered with others of the software domains 102a-102c responsive to federation of the IDPs 106a-106c of the other software domains 102a-102c with their own IDPs 106a-106c. For example, the computer-readable instructions are configured to instruct the one or more processors of the first software domain 102a to provide access to the one or more first software applications (e.g., the service provider apps 104a) of the first software domain 102a to second users registered with the second software domain 102b responsive to federation of the second IDP 106b with the first IDP 106a. Also, the computer-readable instructions are configured to instruct the one or more processors of the first software domain 102a to provide access to the one or more first software applications (e.g., the service provider apps 104a) of the first software domain 102a to the third users registered with the third software domain 102c responsive to federation of the third IDP 106c with the first IDP 106a. Likewise, the one or more processors of the second software domain 102b are configured to provide access to the one or more second software applications of the second software domain 102b to the first users and the second users responsive to federation of the first IDP 106a and the third IDP 106c, respectively, with the second IDP 106b. Similarly, the one or more processors of the third software domain 102c are configured to provide access to the one or more third software applications of the third software domain 102c to the first users and the second users responsive to federation of the first IDP 106a and the second IDP 106b, respectively, with the third IDP 106c.

Figure 6:
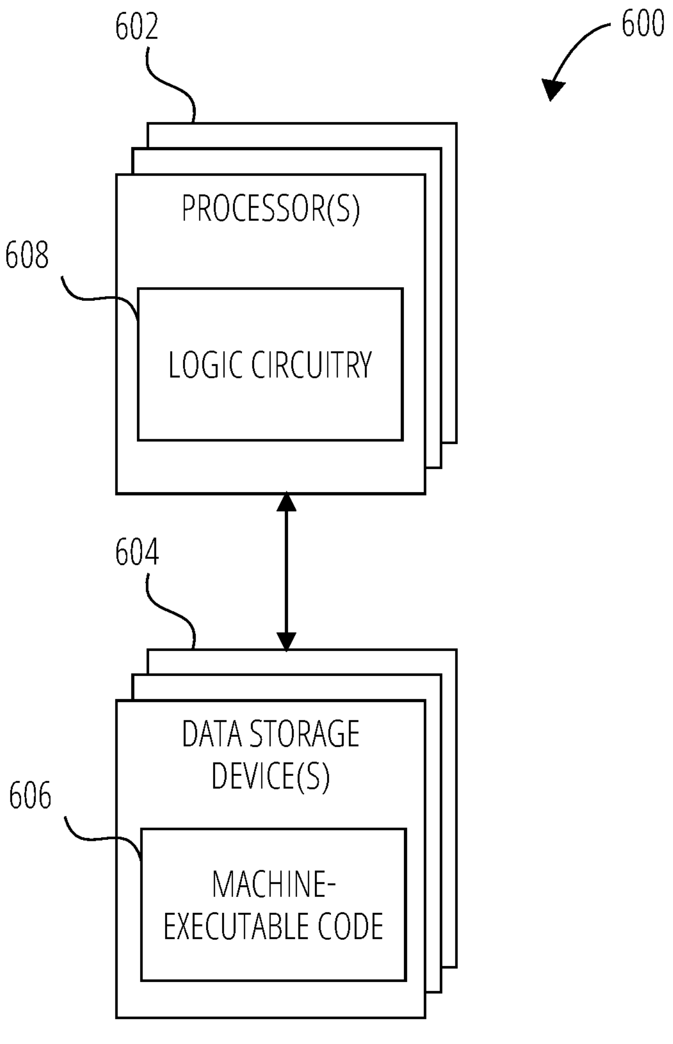
FIG. 6 is a block diagram of circuitry that, in some embodiments, may be used to implement various functions, operations, acts, processes, and/or methods disclosed herein.

The servers 114 include one or more computing devices (e.g., including circuitry such as the circuitry 600 of FIG. 6). The servers 114 include a network interface 118 and one or more processors (e.g., the processors 602 of FIG. 6) communicatively coupled with the network interface. The network interface 118 enables communication with the software domains 102a-102c, which are arranged in the IDP mesh network 116. The one or more processors are configured to operate a superapp 110 to provide, to users of the user devices 108, a platform for accessing software applications provided by the software domains 102a-102c responsive to login credentials (e.g., provided by users via the user devices 108) for any one of the software domains 102a-102c. For example, a user of the user devices 108 may access, via the superapp 110, the service provider apps 104a of the first software domain 102a managed by the first IDP 106a, the service provider apps 104b of the second software domain 102b managed by the second IDP 106b, and the service provider apps 104c of the third software domain 102c managed by the third IDP 106c. The superapp 110 may also provide logged-in users access to one or more local apps 112 managed at the servers 114.

Figure 5:
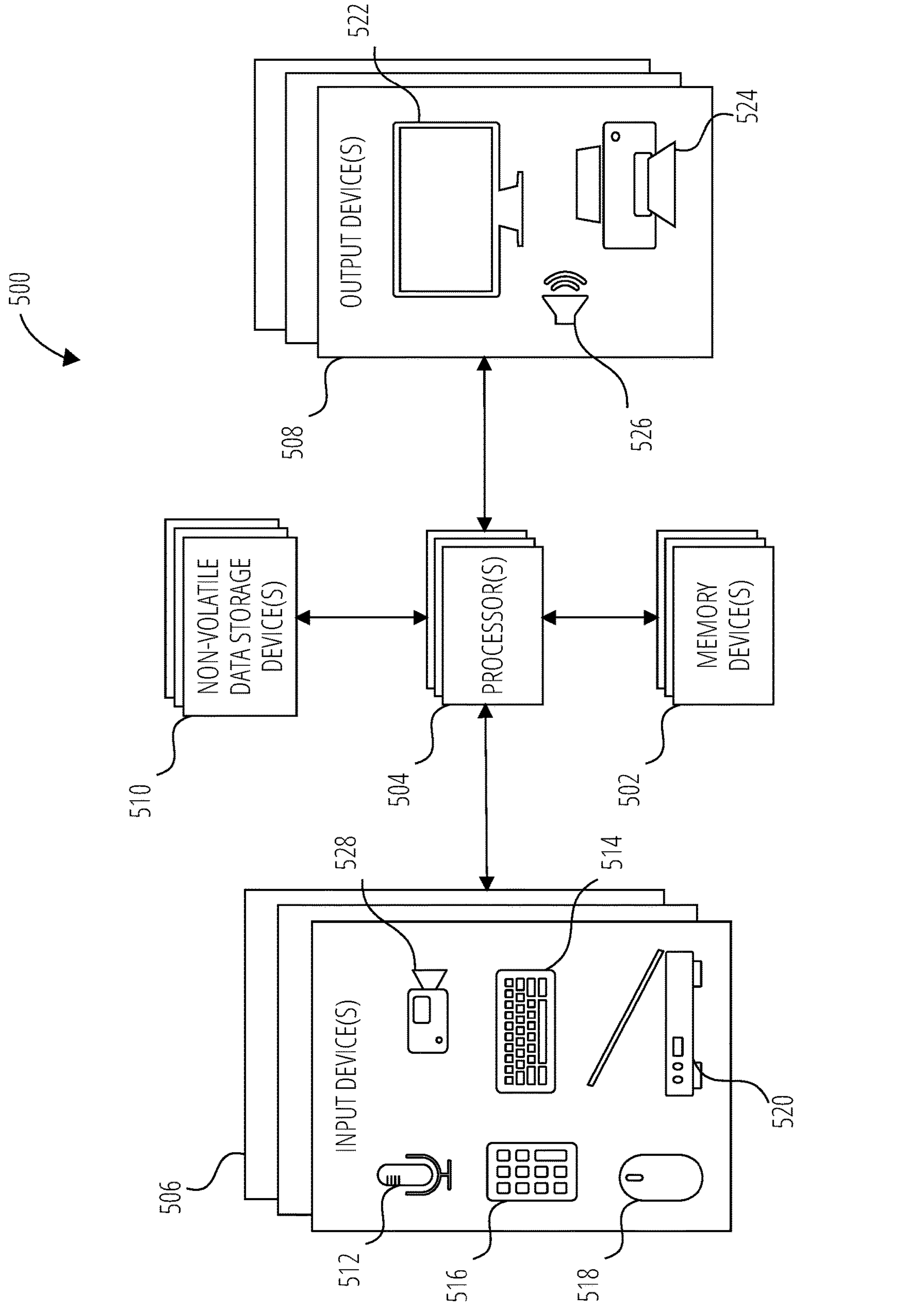
FIG. 5 is a block diagram of a computing system, according to some embodiments.

The user devices 108 may include computing systems such as the computing systems 500 of FIG. 5. The user devices 108 may include personal computers (PCs), mobile devices (e.g., tablet computers, smartphone devices, etc.), point of sale (POS) devices, or any other devices that enable users to interface with the superapp 110. In some embodiments the superapp 110 may be a web application accessed by the user devices 108 via a web browser software application executed on the user devices 108. In some embodiments the superapp 110 may be a software application provided by the servers 114 to the user devices 108 and executed by the user devices 108.

In some embodiments, users of the user devices 108 may use login credentials for one of the IDPs 106*a*-106*c* via the superapp 110 to access one of the software domains 102*a*-102*c*. By way of non-limiting example, one of the IDPs 106*a*-106*c* may (e.g., via the superapp 110) cause the user devices 108 to present a login user interface (e.g., on an electronic display 522 of FIG. 5) to the users and receive login credentials (e.g., via the input devices 506 of FIG. 5) from the users via the login user interface. Once logged in to one of the software domains 102*a*-102*c*, the IDP mesh network 116 may provide the user access to the service provider apps of the software domain the user is logged into, and to the service provider apps of the other software domains. Accordingly, the login credentials used to access any one of the IDPs 106*a*-106*c* may be treated as SSO login credentials.

In some embodiments, the IDP mesh network 116 may provide a logged-in user access to all of the service provider apps 104*a*-104*c*. In some embodiments the IDP mesh network 116 may provide the logged-in user access to only a subset of the service provider apps 104*a*-104*c* that the user is signed up for (e.g., that the user has a subscription for). The servers 114, the IDPs 106*a*-106*c*, or a combination thereof may maintain a database indicating which service provider apps 104*a*-104*c* each user is signed up for.

The different software domains 102*a*-102*c* may provide different service provider apps. For example, service provider apps 104*a* of first software domain 102*a* may include dealer management system and customer relations management software applications while service provider apps 104*b* of second software domain 102*b* may include finance and insurance software applications and service provider apps 104*c* of third software domain 102*c* may include an automobile insurance software application. In some embodiments the various software domains may offer similar, competing software applications. For example, service provider apps 104*a* of first software domain 102*a* may include a first dealer management system software application while service provider apps 104*b* of second software domain 102*b* may include a second competing dealer management system software application).

Figure 2:
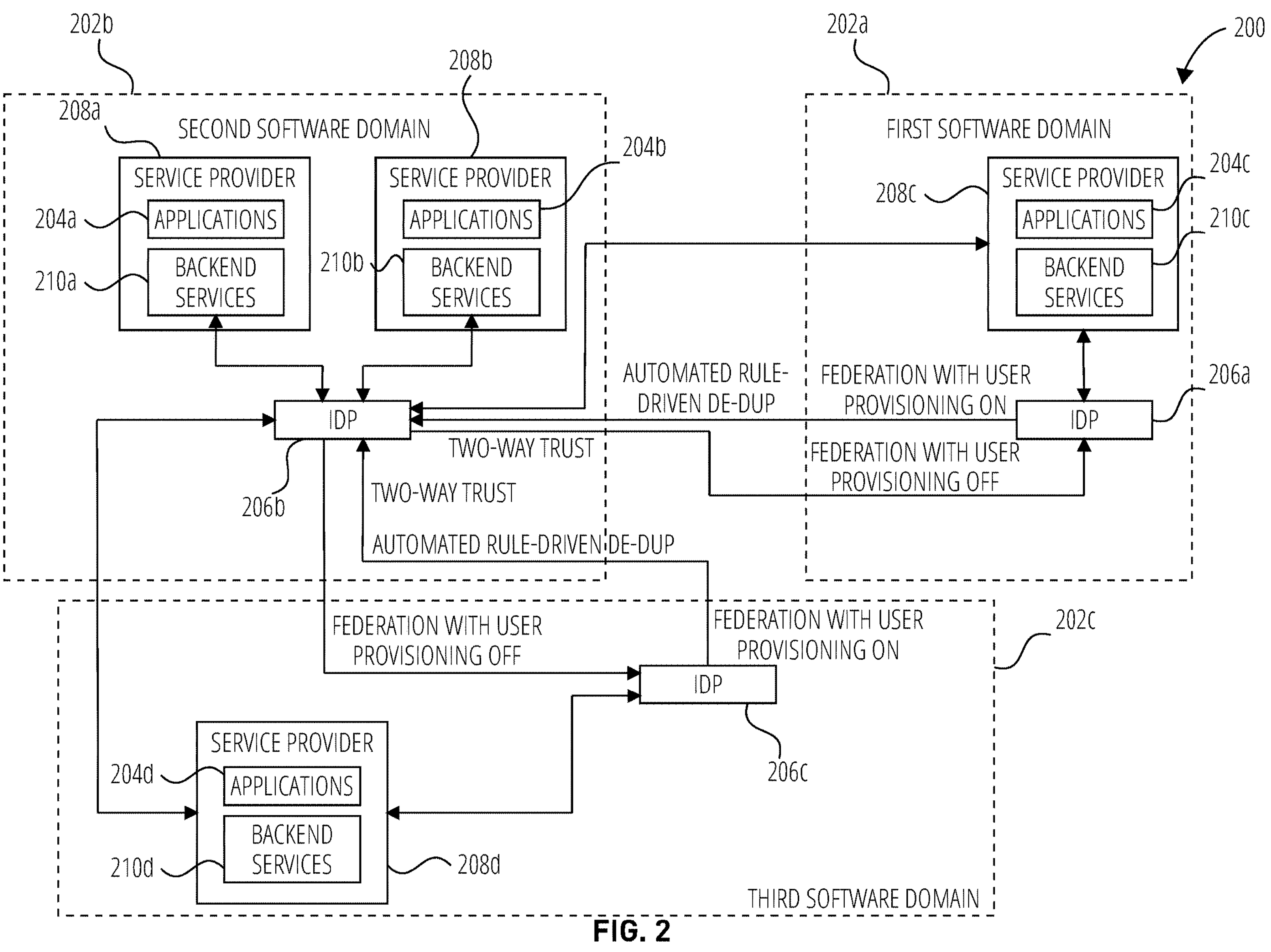
FIG. 2 is a block diagram of an IDP mesh network system, which is an example of the IDP mesh network system of FIG. 1.

FIG. 2 is a block diagram of an IDP mesh network system 200, which is an example of the IDP mesh network system 100 of FIG. 1, according to some embodiments. The IDP mesh network system 200 includes a first software domain 202*a*, a second software domain 202*b*, and a third software domain 202*c* similar to the first software domain 102*a*, the second software domain 102*b*, and the third software domain 102*c* of FIG. 1. The first software domain 202*a* includes service provider 208*c* and a first IDP 206*a* similar to the IDPs 106*a*-106*c* of FIG. 1. The service provider 208*c* includes applications 204*c* similar to the service provider apps 104*a*-104*c* of FIG. 1 and backend services 210*c*.

The second software domain 202*b* includes service provider 208*a*, service provider 208*b*, and a second IDP 206*b* similar to the second IDP 106*b* of FIG. 1. The service provider 208*a* includes applications 204*a* similar to the service provider apps 104*a*-104*c* of FIG. 1 and backend services 210*a*. The service provider 208*b* includes applications 204*b* similar to the service provider apps 104*a*-104*c* of FIG. 1 and backend services 210*b*.

The third software domain 202*c* includes service provider 208*c* and a third IDP 206*c* similar to the IDPs 106*a*-106*c* of FIG. 1. The service provider 208*d* includes applications 204*d* similar to the service provider apps 104*a*-104*c* of FIG. 1 and backend services 210*d*.

Similar to the IDPs 106*a*-106*c* of FIG. 1, at least some of the IDPs 206*a*-206*c* are configured to communicate with each other in a mesh network. In the example illustrated in FIG. 2, second IDP 206*b* is communicatively coupled with first IDP 206*a* and third IDP 206*c*. By this communicative coupling, two-way trust is established between second IDP 206*b* and first IDP 206*a*, and between second IDP 206*b* and third IDP 206*c*. The IDP mesh network system 200 provides for automated user provisioning across mesh IDPs 206*a*-206*c* with de-duplication ("de-dup" in FIG. 2).

By way of non-limiting example, a user profile may be created and registered with first IDP 206*a* for first software domain 202*a*. The user profile may be transmitted (e.g., over a system for cross-domain identity management (SCIM)) to second IDP 206*b*. A rule may be defined in second IDP 206*b* to match user profile attributes (e.g., email address, telephone number, first name, last name, etc.). If a rule match is found (e.g., a user with matching user attributes to those of the user registered with first software domain 202*a* is already registered with second software domain 202*b*), the user profile of first software domain 202*a* may be linked with the matching user profile in second IDP 206*b*. This may reduce duplications of registered users in the software domains 202*a*-202*b*, resulting in automated rule-driven de-dup. If no rule match is found, a new user profile may be created new by second IDP 206*b* to register the new user with the second software domain 202*b*. At this point, the new user may be provided access to applications 204*a*, 204*b*, and 204*c* at the first software domain 202*a* and the second software domain 202*b*.

In the example illustrated in FIG. 2, second software domain 202*b* and its second IDP 206*b* may operate somewhat as a master software domain in that the IDPs 206*a* and 206*c* and service providers 208*c* and 208*d* of the other software domains 202*a* and 202*c* are in communication with the second IDP 206*b* of the second software domain 202*b*. Federation of the second IDP 206*b* with the first IDP 206*a* and the third IDP 206*c* may be performed with user provisioning off. In contrast, federation of the first IDP 206*a* and the third IDP 206*c* with the second IDP 206*b* may be performed with user provisioning on.

The example of FIG. 2 illustrates that IDP mesh networks according to various embodiments of the disclosure may be implemented in various flexible ways. In some embodiments, one or more software domains may be implemented as master software domains (e.g., their IDP being communicatively coupled to multiple IDPs and multiple service providers of multiple different other software domains with federation with user provisioning on in the direction toward the master software domain and user provisioning off in the direction away from the master software domain). In some embodiments, the IDPs of all software domains may be communicatively coupled with the IDPs and service providers of all of the other software domains in a master-less architecture configuration (e.g., with user provisioning on in all directions). It is contemplated within the scope of the disclosure that user provisioning in different directions between IDPs may be flexibly turned on or off, and new software domains may be added or existing software domains may be removed or reconfigured.

FIG. 2 also illustrates that different ones of software domains may include different numbers of service providers that each include their own software applications and back-end services. For example, second software domain 202*b* of FIG. 2 includes two service providers (service provider 208*a* and service provider 208*b*) while first software domain 202*a* includes one service provider (service provider 208*c*) and third software domain 202*c* includes one service provider (service provider 208*d*). In some embodiments a software domain may include more than two service providers (not shown).

Figure 3:
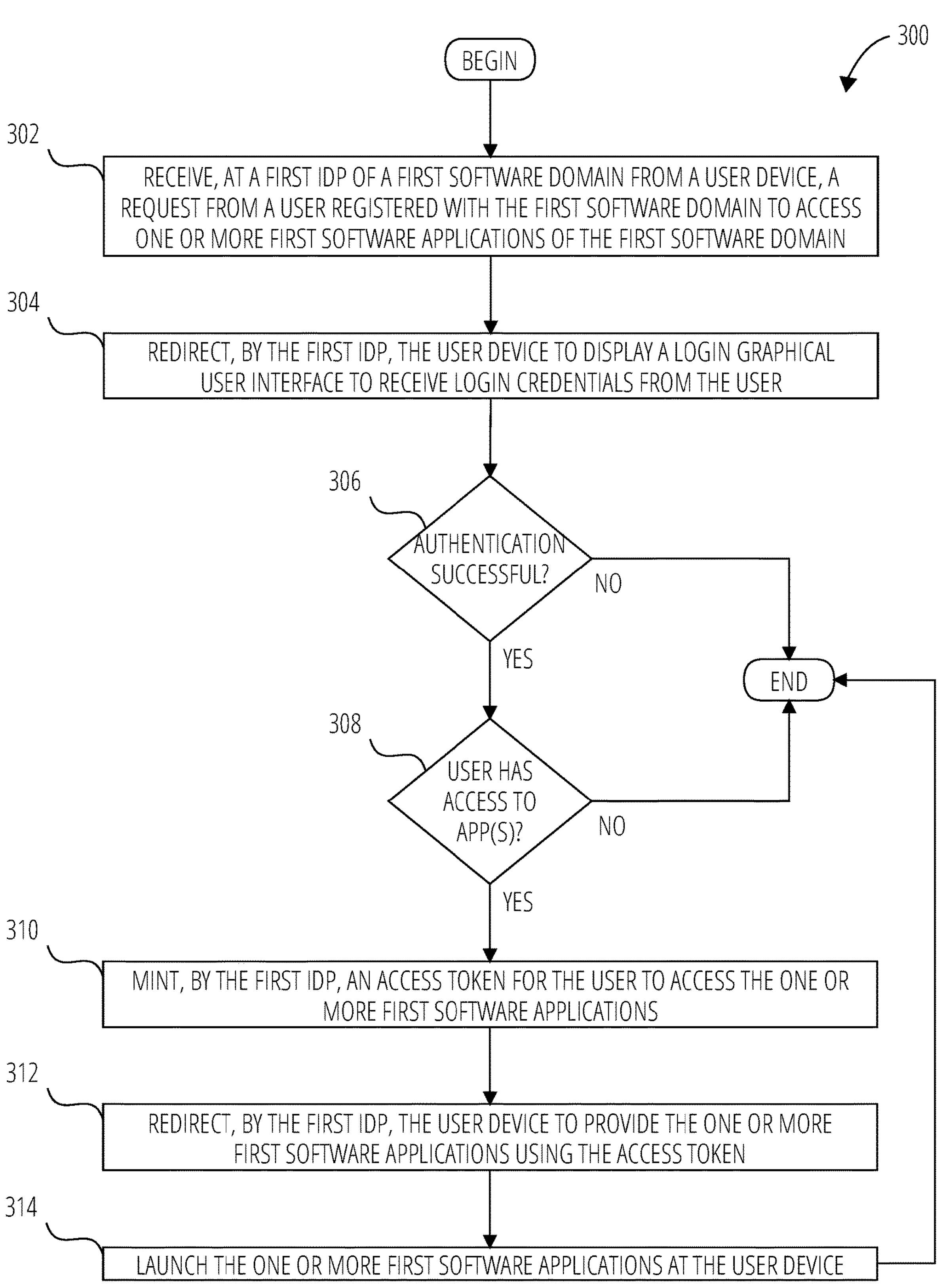
FIG. 3 is a flowchart illustrating a method to be implemented by a new software domain that is to be added to an IDP mesh network, according to some embodiments.

Addition of a new software domain into an IDP mesh network such as those illustrated in FIG. 1 and FIG. 2 with its own separate IDP may be relatively simple as compared to retooling a new software domain to be managed by an existing single IDP without an IDP mesh network. FIG. 3 illustrates a flowchart of operations that may be implemented into a new IDP of a new software domain in order to add the new software domain into an existing IDP mesh network. This flowchart of operations is relatively simple and easy to implement, and may be completed on the order of days or weeks instead of on the order of months and years, which may be the timeline of retooling the new software domain to operate under a single IDP of a system that does not include an IDP mesh network according to various embodiments of the disclosure.

FIG. 3 is a flowchart illustrating a method 300 to be implemented by a new software domain that is to be added to an IDP mesh network, according to some embodiments. The method 300 may be a method to access, by a user registered with a first software domain, service provider software applications managed by the owning IDP of the first IDP. At operation 302, method 300 includes receiving, at a first IDP of a first software domain from a user device, a request from a user registered with the first software domain to access one or more first software applications of the first software domain. At operation 304, method 300 includes redirecting, by the first IDP, the user device to display a login graphical user interface to receive login credentials from the user.

At decision 306, the first IDP determines whether the authentication was successful (e.g., whether the login credentials received at the user device match registered login credentials stored for the registered user). If the authentication was not successful (NO), the method 300 may end. If, however, the authentication was successful (YES), the method 300 may proceed to decision 308, which includes determining whether the user has access to the one or more requested first software applications. If the user does not have access to the one or more requested software applications (NO), the method 300 may end. If, however, the user does have access to the one or more requested software applications (YES), the method 300 may proceed to operation 310. At operation 310, the method 300 includes minting, by the first IDP, an access token for the user to access the one or more requested first software applications.

At operation 312, the method 300 includes redirecting, by the first IDP, the user device to provide the one or more requested first software applications using the access token. At operation 314, the method 300 includes launching the one or more requested first software applications at the user device. The user thus accesses the one or more requested first software applications as per access provision.

Figure 4:
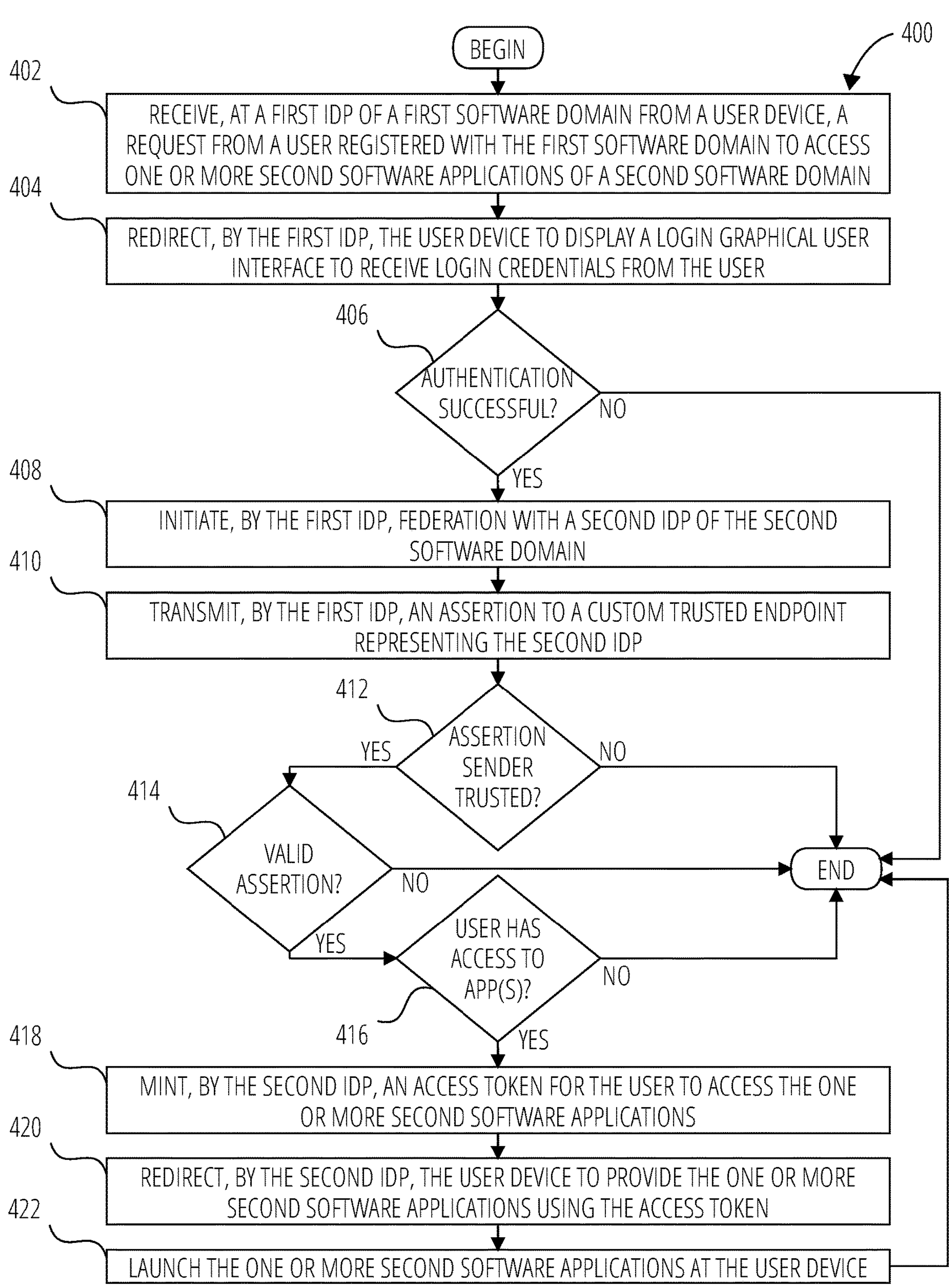
FIG. 4 is a flowchart illustrating a method that may be performed by a software domain added to an IDP mesh network, according to some embodiments.

A software domain that is thus configured to operate according to the method 300 of FIG. 3 may be capable of being added to an existing IDP mesh network according to various embodiments disclosed herein. FIG. 4 illustrates a method 400 that may be performed by such a software domain that implemented the method 300 of FIG. 3 and was subsequently added to an IDP mesh network.

FIG. 4 is a flowchart illustrating a method 400 that may be performed by a software domain added to an IDP mesh network, according to some embodiments. Using the method 400, a user registered with a first software domain may access service provider software applications managed by any other IDP in the IDP mesh network. At operation 402 the method 400 includes receiving, at a first IDP of a first software domain from a user device, a request from a user registered with the first software domain to access one or more second software applications of a second software domain. Accordingly, the user initiates sign-in with the owning IDP of the software domain that the user is registered with. At operation 404 the method 400 includes redirecting, by the first IDP, the user device to display a login graphical user interface to receive login credentials from the user.

At decision 406 the method 400 includes determining whether the authentication was successful. If the authentication was not successful (NO), the method 400 may end. If, however, the authentication was successful (YES), the method 400 may proceed to operation 408. At operation 408 the method 400 includes initiating, by the first IDP, federation with a second IDP of the second software domain. For example, the owning IDP (the first IDP) of the software domain the user is registered with (the first IDP) may initiate a federated SAML exchange with encrypted user assertion with external IDP (the second IDP of the second software domain) (e.g., to target the one or more second software applications managed by the second IDP).

At operation 410 the method 400 includes transmitting, by the first IDP, an assertion (e.g., a SAML assertion) to a custom trusted endpoint representing the second IDP. At decision 412 the method 400 includes determining, by custom trusted endpoint representing the second IDP, whether the assertion sender (the first IDP of the first software domain) is trusted. If the assertion sender is determined to not be trusted (NO), the method 400 may end. If, however, the assertion sender is determined to be trusted (YES), the method 400 proceeds to decision 414. Accordingly, the external IDP (the second IDP) validates the SAML-based user assertion based, at least in part, on pre-configured mutual trust between the first IDP and the second IDP.

At decision 414 the method 400 includes determining, by the custom trusted endpoint representing the second IDP, whether the assertion was a valid assertion. If the assertion is determined to not be a valid assertion (NO), the method 400 may end. If, however, the assertion is determined to be a valid assertion (YES), the method 400 proceeds to decision 416.

At decision 416 the method 400 includes determining, by the custom trusted endpoint representing the second IDP, whether the user has access to the one or more requested second software applications. If it is determined that the user does not have access to the one or more requested second software applications (NO), the method 400 may end. If, however, it is determined that the user has access to the one or more requested second software applications, the method 400 proceeds to operation 418. Accordingly, the second IDP verifies that the user has access to software application features (e.g., the user has a subscription, etc.).

At operation 418 the method 400 includes minting, by the second IDP, an access token for the user to access the one or more second software applications. At operation 420 the method 400 includes redirecting, by the second IDP, the user device to provide the one or more second software applications using the access token. At operation 422 the method 400 includes launching, by the second IDP, the one or more requested second software applications at the user device.

FIG. 5 is a block diagram of a computing system 500, according to some embodiments.

The computing system 500 includes one or more processors 504 operably coupled to one or more memory devices 502, one or more non-volatile data storage devices 510, one or more input devices 506, and one or more output devices 508. In some embodiments the computing system 500 includes a personal computer (PC) such as a desktop computer, a laptop computer, a tablet computer, a mobile computer (e.g., a smartphone, a personal digital assistant (PDA), etc.), a network server, or other computer device.

In some embodiments the one or more processors 504 may include a central processing unit (CPU) or other processor configured to control the computing system 500. In some embodiments the one or more memory devices 502 include random access memory (RAM), such as volatile data storage (e.g., dynamic RAM (DRAM) static RAM (SRAM), etc.). In some embodiments the one or more non-volatile data storage devices 510 include a hard drive, a solid state drive, Flash memory, erasable programmable read only memory (EPROM), other non-volatile data storage devices, or any combination thereof. In some embodiments the one or more input devices 506 include a keyboard 514, a pointing device 518 (e.g., a mouse, a track pad, etc.), a microphone 512, a keypad 516, a scanner 520, a camera 528, other input devices, or any combination thereof. In some embodiments the output devices 508 include an electronic display 522, a speaker 526, a printer 524, other output devices, or any combination thereof.

User devices discussed herein (e.g., the user devices 108 of FIG. 1) may be or may include the computing system 500 of FIG. 1. For example, user interfaces to enable the user to interface with the software applications (e.g., the service provider apps 104*a*-104*c*, the applications 204*a*-204*d*) may be displayed by the electronic display 522 and the user may interact with the user interfaces via the input devices 506 and/or the output devices 508.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 6 illustrates non-limiting examples of implementations of functional elements disclosed herein. In some embodiments, some or all portions of the functional elements disclosed herein may be performed by hardware specially configured for carrying out the functional elements.

FIG. 6 is a block diagram of circuitry 600 that, in some embodiments, may be used to implement various functions, operations, acts, processes, and/or methods disclosed herein. The circuitry 600 includes one or more processors 602 (sometimes referred to herein as "processors 602") operably coupled to one or more data storage devices (sometimes referred to herein as "storage 604"). The storage 604 includes machine-executable code 606 stored thereon and the processors 602 include logic circuitry 608. The machine-executable code 606 includes information describing functional elements that may be implemented by (e.g., performed by) the logic circuitry 608. The logic circuitry 608 is adapted to implement (e.g., perform) the functional elements described by the machine-executable code 606. The circuitry 600, when executing the functional elements described by the machine-executable code 606, should be considered as special-purpose hardware configured for carrying out functional elements disclosed herein. In some embodiments the processors 602 may be configured to perform the functional elements described by the machine-executable code 606 sequentially, concurrently (e.g., on one or more different hardware platforms), or in one or more parallel process streams.

When implemented by logic circuitry 608 of the processors 602, the machine-executable code 606 is configured to adapt the processors 602 to perform operations of embodiments disclosed herein. For example, the machine-executable code 606 may be configured to adapt the processors 602 to perform at least a portion or a totality of the method 300 of FIG. 3 and/or the method 400 of FIG. 4. As another example, the machine-executable code 606 may be configured to adapt the processors 602 to perform at least a portion or a totality of the operations discussed for the servers 114 of FIG. 1, the IDPs 106*a*-106*c* of FIG. 1, and/or the IDPs 206*a*-206*c* of FIG. 2. As a specific, non-limiting example, the machine-executable code 606 may be configured to adapt the processors 602 to implement IDP mesh networks according to various embodiments disclosed herein. As another specific, non-limiting example, the machine-executable code 606 may be configured to adapt the processors 602 to implement the superapp 110 of FIG. 1.

The processors 602 may include a general-purpose processor, a special-purpose processor, a central processing unit (CPU), a microcontroller, a programmable logic controller (PLC), a digital signal processor (DSP), an application specific integrated circuit (ASIC), a field programmable gate array (FPGA) or other programmable logic device, discrete gate or transistor logic, discrete hardware components, other programmable devices, or any combination thereof designed to perform the functions disclosed herein. A general-purpose computer including a processor is considered a special-purpose computer while the general-purpose computer is configured to execute functional elements corresponding to the machine-executable code 606 (e.g., software code, firmware code, hardware descriptions) related to embodiments of the present disclosure. It is noted that a general-purpose processor (may also be referred to herein as a host processor or simply a host) may be a microprocessor, but in the alternative, the processors 602 may include any conventional processor, controller, microcontroller, or state machine. The processors 602 may also be implemented as a combination of computing devices, such as a combination of a DSP and a microprocessor, a plurality of microprocessors, one or more microprocessors in conjunction with a DSP core, or any other such configuration.

In some embodiments the storage 604 includes volatile data storage (e.g., random access memory (RAM)), non-volatile data storage (e.g., Flash memory, a hard disc drive, a solid state drive, erasable programmable read only memory (EPROM), etc.). In some embodiments the processors 602 and the storage 604 may be implemented into a single device (e.g., a semiconductor device product, a system on chip (SOC), etc.). In some embodiments the processors 602 and the storage 604 may be implemented into separate devices.

In some embodiments the machine-executable code 606 may include computer-readable instructions (e.g., software code, firmware code). By way of non-limiting example, the computer-readable instructions may be stored by the storage 604, accessed directly by the processors 602, and executed by the processors 602 using at least the logic circuitry 608. Also by way of non-limiting example, the computer-readable instructions may be stored on the storage 604, transferred to a memory device (not shown) for execution, and executed by the processors 602 using at least the logic circuitry 608. Accordingly, in some embodiments the logic circuitry 608 includes electrically configurable logic circuitry 608.

In some embodiments the machine-executable code 606 may describe hardware (e.g., circuitry) to be implemented in the logic circuitry 608 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEMVERILOG™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 608 may be described in an RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine-executable code 606 may include an HDL, an RTL, a GL description, a mask-level description, other hardware description, or any combination thereof.

In embodiments where the machine-executable code 606 includes a hardware description (at any level of abstraction), a system (not shown, but including the storage 604) may be configured to implement the hardware description described by the machine-executable code 606. By way of non-limiting example, the processors 602 may include a programmable logic device (e.g., an FPGA or a PLC) and the logic circuitry 608 may be electrically controlled to implement circuitry corresponding to the hardware description into the logic circuitry 608. Also by way of non-limiting example, the logic circuitry 608 may include hard-wired logic manufactured by a manufacturing system (not shown, but including the storage 604) according to the hardware description of the machine-executable code 606.

Regardless of whether the machine-executable code 606 includes computer-readable instructions or a hardware description, the logic circuitry 608 is adapted to perform the functional elements described by the machine-executable code 606 when implementing the functional elements of the machine-executable code 606. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations configured to perform the actions of the module or component and/or software objects or software routines that may be stored on and/or executed by general-purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general-purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A first software domain to participate in an identity provider (IDP) mesh network, the first software domain comprising:

one or more processors; and one or more non-transitory computer-readable media having computer-readable instructions stored thereon, the computer-readable instructions configured to instruct the one or more processors to:

manage one or more first software applications of the first software domain; and operate a first IDP to:

provide access to the one or more first software applications of the first software domain to first users registered with the first software domain responsive to first verified login credentials provided to the first IDP;

federate with multiple other IDPs of multiple other software domains networked together in a mesh topology within the IDP mesh network; and federate, with a second IDP of a second software domain participating in the IDP mesh network, access of the first users to one or more second software applications of the second software domain responsive to the first verified login credentials.

2. The first software domain of claim 1, wherein the computer-readable instructions are further configured to instruct the one or more processors to provide access to the one or more first software applications of the first software domain to second users registered with the second software domain responsive to federation of the second IDP with the first IDP.

3. The first software domain of claim 2, wherein the computer-readable instructions are further configured to instruct the one or more processors to operate the first IDP to match user attributes of a second user provided by the second IDP during federation of the second IDP with the first IDP with registered user attributes associated with a registered first user of the first software domain to reduce duplications of registered users of the first software domain and the second software domain.

4. The first software domain of claim 1, wherein the computer-readable instructions are configured to instruct the one or more processors to operate the first IDP to federate, with a third IDP of a third software domain participating in the IDP mesh network, access of the first users to one or more third software applications of the third software domain responsive to the first verified login credentials.

5. The first software domain of claim 4, wherein the computer-readable instructions are further configured to instruct the one or more processors to provide access to the one or more first software applications of the first software domain to third users registered with the third software domain responsive to federation of the third IDP with the first IDP.

6. The first software domain of claim 1, wherein at least one of the one or more first software applications or the one or more second software applications comprises a dealer management system software application.

7. The first software domain of claim 1, wherein the computer-readable instructions are configured to instruct the one or more processors to operate the first IDP to provide user attributes of a first user to the second IDP during a federation of the first IDP to the second IDP to enable the second IDP to reduce duplications of registered users of the first software domain and the second software domain.

8. The first software domain of claim 1, wherein the first IDP is communicatively coupled with all other IDPs of the IDP mesh network.

9. The first software domain of claim 1, wherein the IDP is communicatively coupled with only a subset of other IDPs of the IDP mesh network.

10. The first software domain of claim 1, wherein user provisioning from the first IDP to the second IDP is on.

11. The first software domain of claim 1, wherein user provisioning from the first IDP to the second IDP is off.

12. The first software domain of claim 1, wherein user provisioning from the second IDP to the first IDP is on.

13. The first software domain of claim 1, wherein user provisioning from the second IDP to the first IDP is off.

14. One or more servers, comprising:

a network interface to enable communication with a plurality of software domains arranged in an identity provider (IDP) mesh network, the IDP mesh network including multiple IDPs of multiple different software domains networked together in a mesh topology within the IDP mesh network; and one or more processors communicatively coupled with the network interface, the one or more processors configured to operate a superapp to provide, to users, a platform for accessing software applications provided by the plurality of software domains responsive sign-on credentials for any one of the plurality of software domains.

15. The one or more servers of claim 14, wherein the software operations are automobile dealership software applications.

16. A method of operating an identity provider (IDP) mesh network, the method comprising:

receiving, by a first IDP of a first software domain via a user device, a request from a user registered with the first software domain to access a second software application of a second software domain; and initiating, by the first IDP, federation with a second IDP of the second software domain to obtain, for the user, access to the second software application, the first IDP and the second IDP networked together in a mesh topology within the IDP mesh network with one or more other IDPs of one or more other software domains.

17. The method of claim 16, further comprising:

transmitting, by the first IDP, an assertion to a custom trusted endpoint representing the second IDP;

determining, by the second IDP, whether a sender of the assertion is trusted, whether the assertion is valid, and whether the user has access to the requested second software application; and minting, by the second IDP, an access token for the user to access the one or more second software applications responsive to determining that the assertion sender is trusted, that the assertion is valid, and that the user has access to the requested second software application.

18. The method of claim 17, further comprising:

redirecting, by the second IDP, the user device to provide the requested second software application using the access token; and launching the requested second software application at the user device.

19. The method of claim 17, wherein the assertion comprises a security assertion markup language (SAML) assertion.

20. The method of claim 16, further comprising redirecting, by the first IDP, the user device to display a login graphical user interface to receive login credentials from the user responsive to receiving the request from the user to access the second software application.

* * * * *